Nov. 17, 1964

R. WESTFALL 3,157,051

CONSTRUCTION, METHOD, AND APPARATUS FOR
COUNTERWEIGHT BALANCING

Filed Feb. 18, 1963

Robert Westfall
INVENTOR.

BY R. Frank Smith
Robert W. Hampton
ATTORNEYS

Nov. 17, 1964

R. WESTFALL 3,157,051

CONSTRUCTION, METHOD, AND APPARATUS FOR
COUNTERWEIGHT BALANCING

Filed Feb. 18, 1963

Robert Westfall
INVENTOR.

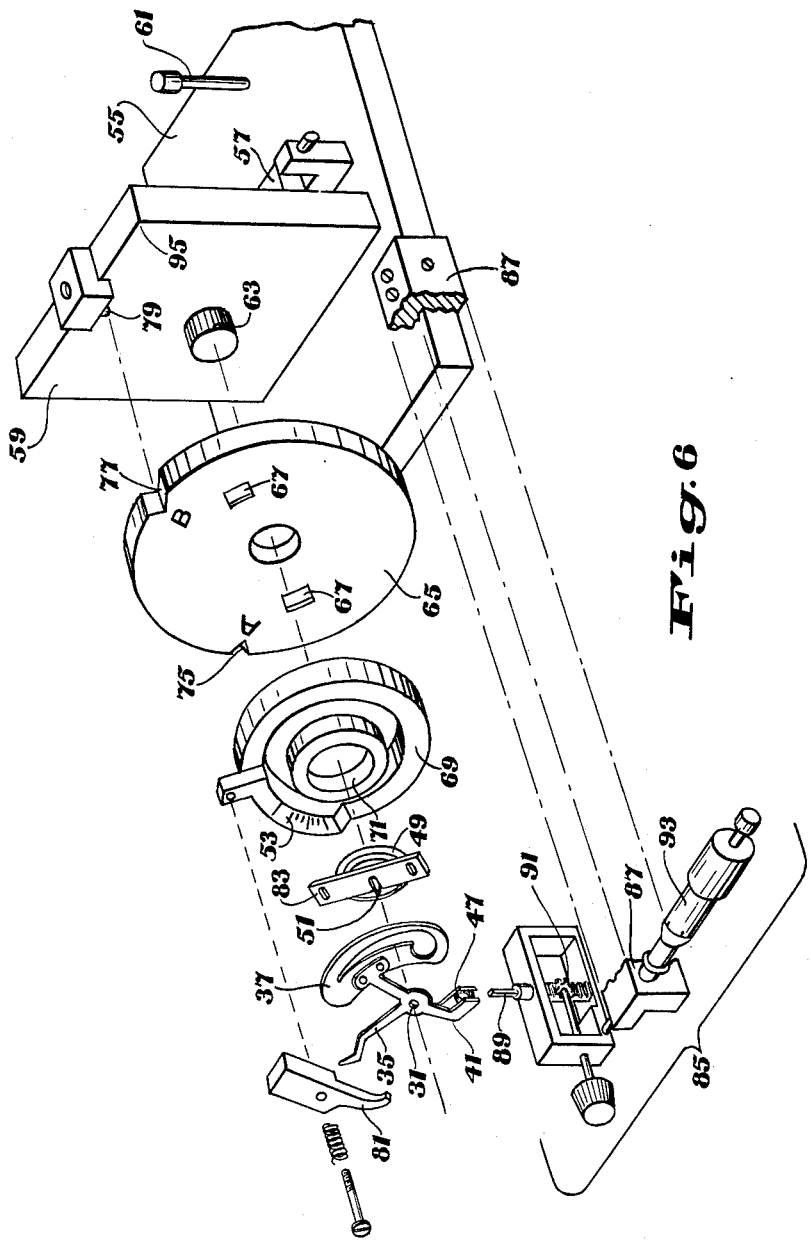

3,157,051
CONSTRUCTION, METHOD, AND APPARATUS
FOR COUNTERWEIGHT BALANCING
Robert Westfall, Rochester, N.Y., assignor to Eastman Kodak Company, Rochester, N.Y., a corporation of New Jersey
Filed Feb. 18, 1963, Ser. No. 259,044
11 Claims. (Cl. 73—480)

This invention relates to counterweighted, axially mounted members, such as the moving pointer elements of sensitive measuring instruments, and to methods and apparatus for balancing such counterweighted members.

Known constructions for moving pointer elements of sensitive measuring instruments include counterweight members comprising laterally extending arms with weights frictionally attached thereto, the weights being movable along the arms. Some constructions utilize drilled and tapped weights mounted on threaded arms. In other constructions adjustable weights, in the form of small springs, tightly encircle the arms. In still another prior art pointer element, a weight in the form of a ring-shaped spring surrounds its axis and is frictionally entwined about radially extending arms of the pointer element. All of these prior art constructions are difficult and time consuming to balance, and great skill and considerable experience is required of persons who do the balancing operation.

The disclosure herein teaches a novel construction for such counterweighted elements, as well as a novel method and novel apparatus for balancing elements constructed according to the teaching herein. Basically, the novel counterweight construction comprises a channel member in which a weight is frictionally supported, the relative size and design of the weight and the channel being such that the weight is movable in any direction in a plane substantially normal to the pointer element axis.

According to the disclosed method for balancing the element by adjustment of the position of the channel-supported weight, the instrument in which the pointer element is mounted is first positioned so that the element axis is substantially vertical. The pointer element is permitted to settle, indicating hair-spring balance, and the position of the pointer element relative to the instrument is noted. Next, the instrument is transferred to an adjusting plane, in which the element axis is approximately horizontal, and oriented so that the relative position of the pointer element is the same as was noted in the horizontal plane. The instrument is then moved about an axis parallel to said element axis to a second orientation in the adjusting plane, the second orientation being separated from the first by an arc of substantially 90°. The difference in the position of the pointer element relative to the instrument in each of the two orientations in the adjusting plane is noted on a scale calibrated in distance through which the weight must be moved in a horizontal plane in order to assure proper balance of the pointer element. The pointer is then trapped at its original settled position relative to the instrument and the weight is moved horizontally the indicated distance. The disclosed apparatus provides means whereby this method may be carried out simply, speedily and efficiently by personnel who may execute this balancing operation without preliminary training in esoteric, pointer-balancing skills.

It is an object of this invention to provide a new and improved construction for counterweighted, axially mounted elements.

Another object is to provide an economical construction for counterweighted instrument pointers wherein a pointer may be easily balanced by simply moving a single counterweight element.

Yet another object is to provide a construction for counterweighted instrument pointers wherein a single counterweight element may be easily moved in any direction in at least one plane to achieve pointer balance.

A further object of the invention is to provide a new and improved method for balancing counterweighted instrument pointer elements having an adjustable weight frictionally mounted for multi-directional movement.

Still another object is to provide a new and improved apparatus for simply and speedily balancing pointer elements of sensitive measuring instruments in which said pointer elements have counterweight members including a frictionally mounted weight which is movable in any direction in at least one plane.

Other objects, purposes and characteristic features of the present invention will be in part obvious from the accompanying drawings, and in part pointed out as the description of the invention progresses. In describing the invention in detail, reference will be made to the accompanying drawings in which like reference characters designate corresponding parts throughout the several views, and in which:

FIG. 6 illustrates in exploded perspective one embodiment of novel apparatus for carrying out the balancing method disclosed herein.

While the invention herein applies equally to all constructions embodying counterweighted, axially mounted elements, the disclosure herein will be generally limited to a description referring with particularity to one special type of instrument pointer element used in conjunction with a sensitive galvanometer in the automatic exposure control system of a camera. The particular pointer element referred to herein includes a needle member which may be trapped or used for visual indication, as well as a vane member which has an arcuate aperture which, in cooperation with the camera's optical system, provides a variable camera diaphragm that is adjusted automatically in accordance with the incident illumination reflected from the scene being photographed.

Figure 1:
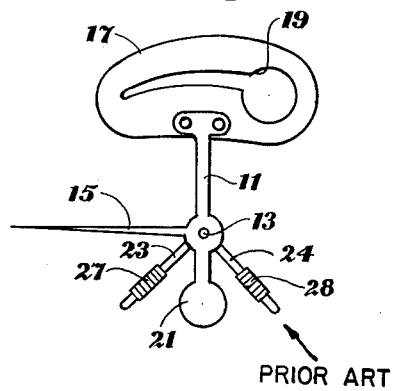
FIGS. 1 and 2 are examples of prior art constructions for sensitive instrument pointer elements.
Figure 2:
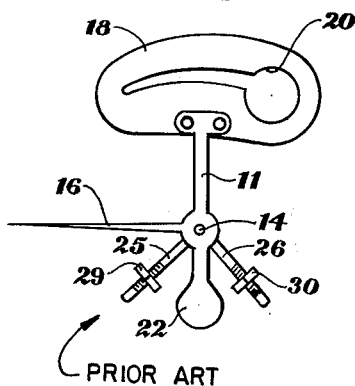

FIGS. 1 and 2 illustrate two prior art constructions for such pointer-vane elements used in automatic cameras. Pointer elements 11 and 12 are designed to be axially mounted for rotational movement, respectively, around points 13 and 14, said elements including respective needle members 15 and 16 and respective vane members 17 and 18, the latter members having arcuate apertures 19 and 20. Each pointer element 11 and 12 also includes a counterweight portion comprising fixed counterweights 21 and 22, and respective arms 23, 24, 25 and 26. Fine balancing is accomplished, respectively, by varying the position of spring weights 27 and 28 along arms 23 and 24, and by positioning drilled and tapped weights 29 and 30 along threaded arms 25 and 26. In practice, balance of pointer elements 11 and 12 is obtained only through trial and error testing, and operators balancing these elements must be highly skilled in judging the effect on element equilibrium occasioned by the movement of the respective weights along their respective arms. The complexity of the balancing operation may be appreciated from the fact that the movement of a single weight in either of its predetermined directions tends to alter the equilibrium of the element in differing degrees in all orientations.

Counterweight Construction

Figure 3:
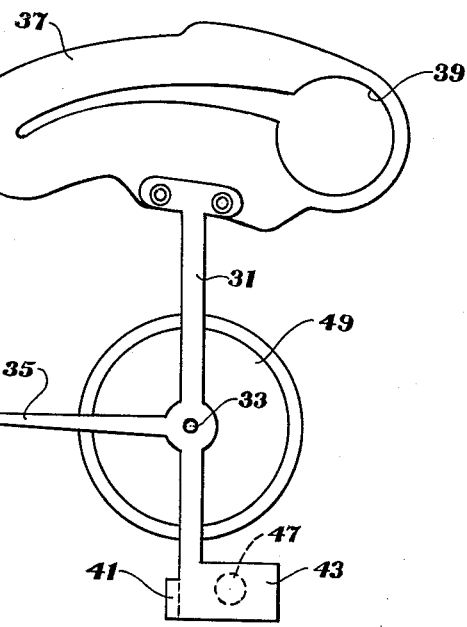
FIGS. 3 and 4 are two views of a sensitive instrument pointer element constructed according to the invention herein.
Figure 4:
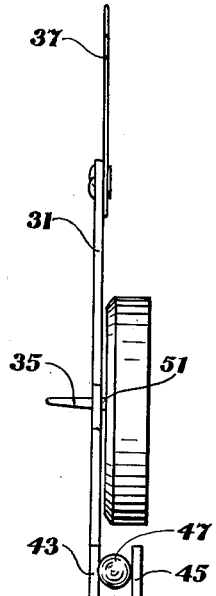

Referring now to the construction according to the invention herein as illustrated in FIGS. 3 and 4, pointer element 31, which is designed to be axially mounted for rotational movement about point 33, includes needle member 35 and vane member 37, the latter having arcuate aperture 39. The fixed counterweight is in the form of U-shaped channel 41 having side members 43 and 45, while fine adjustment is provided by the positioning of spherical weight 47 which is frictionally supported within channel member 41. Pointer element 31 is affixed to galvanometer instrument 49 by means of axle 51.

Spherical weight 47 may be moved in any direction within channel member 41, and only the positioning of this single adjustable weight is necessary for balancing purposes. Since spherical weight 47 is free to move in any direction within channel 41, it can be seen that once the direction and amount of imbalance is determined, weight 47 may be moved simply and directly in the direction and distance indicated by such determination. Further, as will be explained below, this construction makes possible the balancing of pointer element 31 in one orientation by the adjustment of weight 47 without in any way affecting the pointer element equilibrium in other preselected orientations.

Method for Balancing Pointer Element

Figure 5:
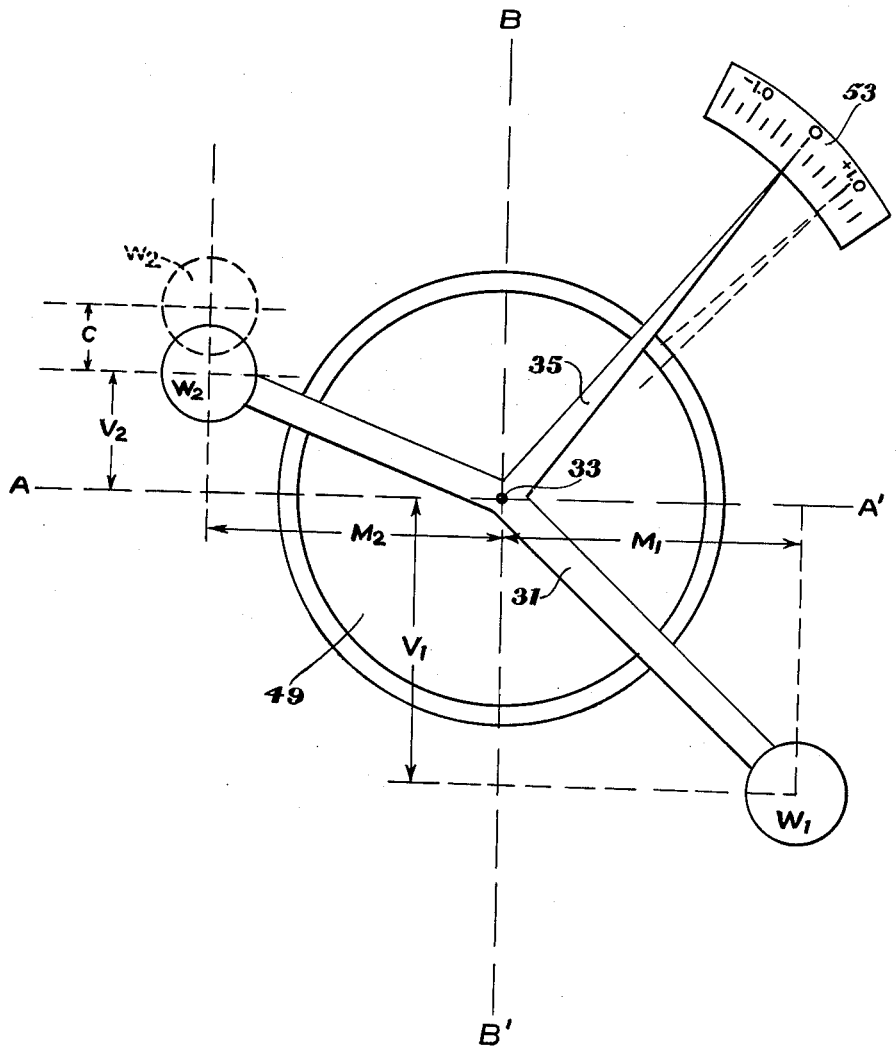
FIG. 5 is a schematic representation of the physical theory underlying the novel method taught herein for balancing pointer elements constructed according to the invention herein.

A method has been devised for balancing the disclosed pointer element, and this method takes full advantage of the construction of the counterweight which, as explained above, permits adjustable weight 47 to be moved in any direction within the plane of channel 41. Reference is made to FIG. 5 which is a schematic representation of the physical theory underlying the method which shall now be described as applied to the balancing of pointer element 31 mounted, as illustrated, on axle 51 of electrical measuring instrument 49 for rotation about point 33, the deflection of pointer element 31 being limited in the conventional manner by hair-springs (not shown).

In its most general terms, the balancing method taught herein comprises the following steps:

*Step 1.*—Measuring instrument 49 is positioned so that axle 51 or, more particularly, the pointer element axis is substantially vertical, and pointer element 31 is permitted to settle, indicating the position in which the forces induced by the hair-springs are in balance. This pointer element position is noted. Practically, this may be accomplished by moving an index mark, such as the "0" mark on scale 53, until it matches the position of needle 35 of pointer element 31. Scale 53 should be initially adjustable relative to instrument 49, and thereafter, during the remaining steps set forth below, should remain in this initial relative position.

*Step 2.*—Measuring instrument 49 is next transferred to an adjusting plane in which the pointer element axis is substantially horizontal. It should be noted that any imbalance in pointer element 31 due to misassembly, tolerance build-up etc., should theoretically cause rotation of the element about pointer 33 as long as its axis of rotation is in any non-vertical plane. However, for practical purposes it is desirable to place the axis of rotation in a generally horizontal plane to maximize any resulting rotational movement of pointer element 31 due to its imbalance.

*Step 3.*—Instrument 49 and scale 53 are then moved together in this adjusting plane to a first orientation in which pointer element 31 settles in the same relative position noted in "Step 1" above. This re-zeroing of the pointer element is essential to assure that the balancing of improper weight distribution will not affect the element's hair-spring balance.

These first three steps are illustrated symbolically in FIG. 5 by the position of pointer element 31 which is drawn schematically with vane member 37 being represented generally as symbolic weight $W_1$ and the counterweight member, comprising channel 47 and adjustable weight 49, being represented by symbolic weight $W_2$. It is assumed that instrument 49 is oriented such that reference base line A—A' is horizontal, and that instrument 49 has been moved along with scale 53 until pointer element 31 is settled in the position shown, namely, with pointer 35 aligned with the "0" mark of scale 53, indicating the initial relative position of hair-spring balance.

Since pointer element 31 is at rest, it may be assumed that the forces tending to rotate pointer element 31 about point 33 are in balance. Therefore, it can be said that the weight $W_1$, which acts through a theoretical lever arm equivalent to the distance $M_1$, is balanced by the weight $W_2$, acting through the theoretical distance $M_2$. This condition of equilibrium can be stated symbolically by the equation:

$$W_1 M_1 = W_2 M_2 \qquad (1)$$

*Step 4.*—Instrument 49 is next moved about an axis parallel to axle 51, i.e., parallel to the axis of rotation of pointer element 31, and through an arc of substantially 90° to a second orientation in the adjusting plane. This new orientation can be visualized from FIG. 5 by considering that the new base is represented by line B—B', which is now viewed as being horizontal, while line A—A' now represents the vertical.

*Step 5.*—Any change in the position of pointer element 31 relative to instrument 49 is once again noted following this movement of instrument 49 to this second orientation. In FIG. 5, it is assumed that when instrument 49 is moved to this second orientation, imbalance causes pointer element 31 to also move relative to instrument 49 so that needle 35 comes to rest in alignment with index mark "1.0" on scale 53. It can be seen that in this position, i.e., with line B—B' representing the new horizontal base, the balance of forces acting to rotate pointer 31 about point 33 can be approximately represented by the equation:

$$W_1 V_1 = W_2 V_2 \qquad (2)$$

From the direction of relative movement of needle 35, it can be seen that if adjustable weight $W_2$ were moved in a horizontal direction to increase distance $V_2$ by some empirically determined amount "C," pointer element 31 would rotate counterclockwise to its initial relative position aligning needle 35 with the "0" mark on scale 53.

*Step 6.*—With instrument 49 remaining in said second orientation, pointer element 31 is rotated counterclockwise until needle 35 is once again aligned with index mark "0" on scale 53, and pointer element 31 is then trapped in this position. It is imperative that this step (namely, trapping pointer element 31 in its original position relative to instrument 49) be taken prior to moving weight $W_2$. This is done to assure that the adjustment of weight $W_2$ will not upset the equilibrium that exists when instrument 49 is in its initial orientation on the horizontal base represented by line A—A'.

*Step 7.*—Adjustable weight $W_2$ is now slid in a substantially horizontal direction to the position shown in dotted lines, thereby increasing its lever arm distance $V_2$ by the correction amount "C." Balance is now achieved in the second orientation with needle 35 aligned with the "0" mark rather than the "+1.0" mark of scale 53, and this new balance can be represented by the equation:

$$W_1 V_1 = W_2 (V_2 + C) \qquad (3)$$

It is essential to note that the movement of adjustable weight $W_2$ from its initial position to the position shown in dotted lines in FIG. 5 not only achieved "0" balance for pointer element 31 on horizontal base B—B', but also that this movement of weight $W_2$ in no way affected the "0" balance of pointer element 31 on horizontal base A—A'. This can be understood by viewing FIG. 5 once again with line A—A' as the horizontal base and noting that the just described adjustment of weight $W_2$ was solely along a vertical line, i.e., perpendicular to base A—A', and therefore the movement of weight $W_2$ in no way affected the length of lever arm $M_2$, and equilibrium in the initial orientation may still be represented by Equation 1.

Therefore, having balanced pointer element 31 relative to instrument 49 in two instrument positions substantially 90° apart without upsetting the initial hair-spring equilibrium, as exemplified symbolically by Equations 1 and 3 and as illustrated diagrammatically in FIG. 5 by the "0" position of needle 35 on both base A—A' and base B—B', the element is now in balance for any instrument orientation.

Apparatus for Balancing Pointer Element

Apparatus for balancing pointer elements constructed according to the invention herein is illustrated in FIG. 6. Mounted on base 55 by means of hinge 57 is tilting plate 59 which is movable from the substantially vertical position as shown to a substantially horizontal position supported by post 61. Tilting plate 59 has an arbor 63 on which turntable 65 is mounted.

Turntable 65 carries slide members 67 which cooperate with a friction groove (not shown) in the base of scale ring 69 to support scale ring 69 with its instrument receptacle 71 for rotational movement relative to turntable 65. Indentations 75 and 77 (also marked "A" and "B," respectively) on the outer circumference of turntable 65 are substantially 90° apart and cooperate with spring detent 79 mounted on tilting plate 59 to arrest the rotational movement of turntable 65 at predetermined positions. Scale ring 69 carries scale 53 as well as spring-biased pointer clamp 81.

To facilitate visualization of the operation of the counterweight adjusting means, FIG. 6 also shows the relative position of instrument 49, with attached mounting plate 83, and pointer element 31. A micrometer adjusting means (shown generally at 85) is attached to base 55 by means of mounting block 87 and includes a weight positioning finger 89. Finger 89 is adjustable in a vertical direction by means of rack and pinion mechanism 91, and is adjustable in a horizontal direction by means of micrometer screw mechanism 93.

In explaining the operation of the apparatus just described, the following will be assumed: (1) that the apparatus is being used to test one of a series of similar sensitive measuring instruments being produced and adjusted in relatively large quantities; (2) that scale 53 is calibrated in thousandths of an inch, the calibration being empirically calculated to determine the horizontal distance through which adjustable weight 47 must be moved to assure alignment of needle 35 with index mark "0" when instrument 49 is in the second rest position as explained above; and (3) that during the original assembly of pointer element 31, spherical weight 47 is purposely placed near the open end of channel 41, causing the pointer element to be unbalanced in a predetermined direction.

Initially, tilting plate 59 rests on post 61 in a substantially horizontal plane, permitting easy loading and unloading of instruments into receptacle 71 of scale ring 69, and instrument 49 is placed into receptacle 71 in such a manner that when pointer element 31 settles, needle 35 is aligned with "0" on scale 53 and is generally aligned with corner 95 of tilting plate 59. At this time, turntable 65 is positioned so that indentation "A" is properly aligned with spring detent 79. Tilting plate 59 is then moved into its vertical adjusting position as illustrated in FIG. 6, and a small drop of epoxy cement, or other cement with which there is no weight loss on curing, is placed on spherical weight 47.

Following this initial preparation, scale ring 69 is rotated on slide members 67 until pointer element 31 settles with needle 35 realigned with the "0" index mark on scale 53, indicating the relative position of hair-spring balance as described above. Next, turntable 65 is rotated about arbor 63 to a new orientation on a horizontal base substantially 90° removed from the "A" position, namely, with indentation "B" engaging spring detent 79. The rotation of turntable 65 also moves scale ring 69 and measuring instrument 49 through an arc of substantially 90°.

Since spherical weight 47 is initially placed within channel 41 in a position of slight imbalance, as is assumed above, the change in position of the entire instrument 49 causes unbalanced pointer element 31 to move to a new position relative to instrument 49. While the amount of relative movement of pointer element 31 varies in accordance with variations in the exact weight and position of the various members of element 31, this variation is always in the same general direction due to the intentional imbalance occurring at the time of the initial assembly. After pointer element 31 settles in its new relative position, the amount of pointer element displacement is determined by noting the relative position of needle 35 along scale 53 which, as explained above, is calibrated in thousandths of inch of horizontal movement required of spherical weight 47 to realign needle 35 with index mark "0."

After noting the indicated amount of movement necessary for balancing, element 31 is moved until needle 35 is once again aligned with the "0" index mark on scale 53, and then pointer element 31 is clamped by means of spring-biased pointer clamp 81 in this "0" position which, as described above, is its position of hair-spring equilibrium and also its equilibrium position relative to instrument 49 when the latter is oriented on base "A." As was also explained above, although instrument 49 is still oriented on base "B" (represented by horizontal line B—B' in FIG. 5), the clamping of pointer element 31 in its base "A" equilibrium position assures that any adjustment of weight 47 in a horizontal direction (parallel to line B—B') will appear as a vertical displacement when instrument 49 is again oriented base "A" and so will in no way affect its equilibrium in the latter orientation.

Once pointer element 31 is clamped, counterweight positioning finger 89 is moved into contact with spherical weight 47 by proper adjustment of rack and pinion mechanism 91 and micrometer screw mechanism 93, and then, by using only micrometer mechanism 93 and screwing that mechanism the exact distance as was indicated by the secondary position of pointer 35 along scale 53, spherical weight 47 is moved in channel 41 to the proper position for balancing pointer element 31. This achieves the weight balance at two positions 90° apart without affecting hair-spring equilibrium and the instrument is balanced for any orientation. Tilting plate 59 is then returned to its initial horizontal position resting on post 61, needle 35 is unclamped, and instrument 49 is removed from receptacle 67. The epoxy cement cures (without weight loss) and spherical weight 47 is rigidly fixed to channel 41 in the balancing position to which it has been adjusted.

It can be seen that the counterbalance construction disclosed herein greatly simplifies the problem of balancing the pointer elements of sensitive measuring instruments, and, when coupled with the method disclosed herein as practiced by the apparatus just explained above, the balancing of a sensitive pointer element can be achieved simply, economically, and speedily by personnel who do not require the long training in specialized balancing skills which has been necessary with prior art constructions.

Having described only one specific embodiment of the construction disclosed herein, and only one specific embodiment of apparatus for carrying out the disclosed method for balancing pointer elements made in accordance with that construction, it should be understood that the particular forms selected have been chosen to facilitate the disclosure of the invention rather than to limit in any way the number of forms which the invention may assume. Further, it should be understood that various modifications, adaptations, and alterations may be applied to the specific forms shown to meet the various requirements of practice, without in any manner departing from the spirit or scope of the present invention.

What is claimed is:

1. An axially mounted instrument element comprising an index member, and a counterweight having a channel member and a weight frictionally supported within said channel member for movement in any direction in at least one plane.

2. The instrument element according to claim 1 wherein said channel member is substantially U-shaped in cross section.

3. The instrument element according to claim 1 wherein the shape of said weight is substantially spherical.

4. Means for balancing an axially mounted element comprising a channel member integral with said element, and an adjustable weight frictionally supported within said channel member for movement in any direction in at least one plane.

5. A pointer element for an electrical measuring instrument comprising an index member of fixed weight and shape, and a counterweight having a channel member and a ball weight frictionally supported in said channel member, the position of said ball in said channel being adjustable in any direction in at least one plane to balance said element.

6. Apparatus for balancing a pointer element axially mounted on an instrument and having a counterweight including an adjustable weight frictionally supported within a channel member for movement in any direction in at least one plane, said apparatus comprising: a receptacle for rigidly supporting said instrument and causing said element to be free for movement about its axis, said receptacle being movable about an axis substantially parallel with said instrument axis; tilting means for alternatively maintaining said receptacle in both a substantially horizontal plane and in a non-horizontal plane normal to said receptacle axis; turntable means for selectively moving said receptacle about its said axis to either of two orientations separated by an arc of substantially 90°; indication means alignable with said instrument element to provide an indication of the relative movement of said element as the position of said receptacle is altered by said tilting and turntable means; and counterweight adjusting means for positioning said frictionally supported weight to balance said element.

7. The apparatus according to claim 6 wherein said indication means comprises: a scale calibrated to indicate the distance said weight must be moved to balance said element, and wherein said counterweight adjusting means includes a scale for indicating the distance through which said weight is moved.

8. The apparatus according to claim 6 wherein said tilting means comprises: a plate movable between a substantially horizontal position and a substantially vertical position, and an arbor perpendicularly attached to said plate; and wherein said turntable means comprises: a turntable rotatably mounted on said arbor, and means for selectively securing said turntable in either of two positions separated by an arc of substantially 90°.

9. The apparatus according to claim 6 wherein said counterweight adjusting means comprises: clamping means for holding said instrument element in a predetermined position, and micrometer screw means for positioning said weight.

10. The method of balancing a pointer element axially mounted in a measuring instrument and having a counterweight including a weight frictionally supported for movement in any direction within a channel member, said method comprising the steps of:

(a) supporting said instrument in a substantially horizontal plane normal to the axis on which said element is mounted and noting the position of said element relative to said instrument;

(b) transferring said instrument to a non-horizontal adjusting plane normal to the axis on which said element is mounted;

(c) moving said instrument in said adjusting plane to a first orientation in which the position of said element relative to said instrument is substantially the same as is noted when said instrument is supported in said horizontal plane;

(d) rotating said instrument about an axis substantially parallel to said element-mounting axis to a second orientation removed from said first orientation by an arc of substantially 90°;

(e) noting the change in said relative position of said element;

(f) trapping said element in its original position relative to said instrument in said first orientation; and (g) sliding said weight in said channel member in a substantially horizontal direction and through a distance determined according to the imbalance of said element as indicated by the change in its relative position when said instrument is moved between said first and second orientations.

11. The method according to claim 10 wherein, prior to noting said original position of said element, a cement having a substantially constant weight curing reaction is applied to said adjustable weight.

References Cited in the file of this patent

UNITED STATES PATENTS

| | | |
|---|---|---|
| 1,029,042 | Beede | June 11, 1912 |
| 1,861,255 | Arey | May 31, 1932 |
| 2,045,677 | Schock | June 30, 1936 |
| 3,041,536 | Horan | June 26, 1962 |
| 3,106,906 | Palmer | Oct. 15, 1963 |